United States Patent [19]

Preece et al.

[11] 4,156,817

[45] May 29, 1979

[54] STARTER MOTORS

[75] Inventors: Kenneth Preece, Solihull; David F. Spriggs, Sutton Coldfield, both of England

[73] Assignee: Joseph Lucas (Industries) Limited, Birmingham, England

[21] Appl. No.: 569,760

[22] Filed: Apr. 21, 1975

Related U.S. Application Data

[63] Continuation of Ser. No. 423,304, Dec. 10, 1973, which is a continuation of Ser. No. 225,822, Feb. 14, 1972, abandoned.

[30] Foreign Application Priority Data

Feb. 19, 1971 [GB] United Kingdom ................. 5050/71
Sep. 21, 1971 [GB] United Kingdom ............... 43908/71

[51] Int. Cl.[2] ............................................... H02P 9/00

[52] U.S. Cl. ............................. 290/38 R; 123/179 M; 310/80

[58] Field of Search ........................ 310/67, 80, 75, 83, 310/75 A, 78, 79, 112, 114, 209, 92, 96, 98, 100, 43, 66, 75 C, 41; 123/179 B, 179 M, 179 S; 290/37, 38 R, 38 A; 74/6

[56] References Cited

U.S. PATENT DOCUMENTS

| | | | |
|---|---|---|---|
| 2,670,444 | 2/1954 | Schneider | 290/37 |
| 3,084,561 | 4/1963 | Mattson | 290/38 |
| 3,124,694 | 3/1964 | Seilly | 123/179 M |
| 3,210,554 | 10/1965 | Seilly | 123/179 M |
| 3,358,667 | 12/1967 | Gubb | 290/38 |
| 3,359,440 | 12/1967 | West | 310/83 |
| 3,509,506 | 4/1970 | Bird | 290/38 |
| 3,597,622 | 8/1971 | Wilson | 290/37 |

*Primary Examiner*—R. Skudy
*Attorney, Agent, or Firm*—Holman & Stern

[57] ABSTRACT

A starter motor for an internal combustion engine includes a shaft rotated by an electric motor, a pinion gear wheel carried by the shaft the gear wheel being rotated with the shaft and axially movable relative thereto between an operative position and a rest position, and an electro-magnet for moving the pinion from its rest position to its operative position. The electro-magnet includes an armature which is coupled to the pinion gear wheel, and which is guided for movement parallel to the shaft. First and second electro-magnet poles are spaced apart around the shaft and are spaced from the armature in the rest position of the armature in the direction of movement of the armature. A member magnetically interconnects the two poles, and the electro-magnet further includes a winding which when energized induces a flow of magnetic flux from the first pole to the armature within the armature laterally relative to the shaft, from the armature to the second pole, and from the second pole within the member back to the first pole.

60 Claims, 25 Drawing Figures

STARTER MOTORS

This is a continuation of application Ser. No. 423,304 filed Dec. 10, 1973 which in turn is a Rule 60 continuation application of Ser. No. 225,822 filed Feb. 14, 1972, now abandoned.

This invention relates to starter motors for internal combustion engines.

A starter motor according to the invention comprises an electric motor, a shaft rotated by said motor, a pinion gear wheel carried by said shaft, the pinion gear wheel being rotated with the shaft and axially movable relative thereto between an operative position and a rest position, and, an electro-magnet comprising an armature coupled to the pinion gear wheel and guided for movement parallel to the shaft, first and second electromagnet poles spaced apart around said shaft, the first and second poles being spaced from the armature in the rest position thereof in the direction of movement of the armature a member magnetically interconnecting the first and second poles, and an electromagnet winding which when energised induces a flow of magnetic flux from the first pole to the armature, within the armature laterally relative to said shaft, from the armature to the second pole, and from the second pole within said member back to the first pole.

In the accompanying drawings:

FIG. 1 is a sectional view of part of a starter motor in accordance with a first example of the invention.

FIG. 2 is a sectional view on the line 2—2 in FIG. 1 with parts thereof omitted for clarity, FIG. 3 is a transverse sectional view of a starter motor in accordance with a second example of the invention, with the rotor shaft and pinion assembly of the starter motor omitted for clarity, FIG. 4 is a sectional view on the line 4—4 in FIG. 3 but showing the rotor shaft and pinion assembly omitted from FIG. 3, FIG. 5 is a view similar to FIG. 4 of a further form of starter motor according to a third example of the invention, FIG. 6 is a view similar to FIG. 5 and illustrating a modification of the arrangement shown in FIG. 5, FIG. 7 is a view similar to FIG. 5 illustrating a further modification, FIG. 8 is a view similar to FIG. 5 illustrating a third modification, FIGS. 9 to 12 are diagrammatic views illustrating four armature and pole shape modifications.

Figure 1:
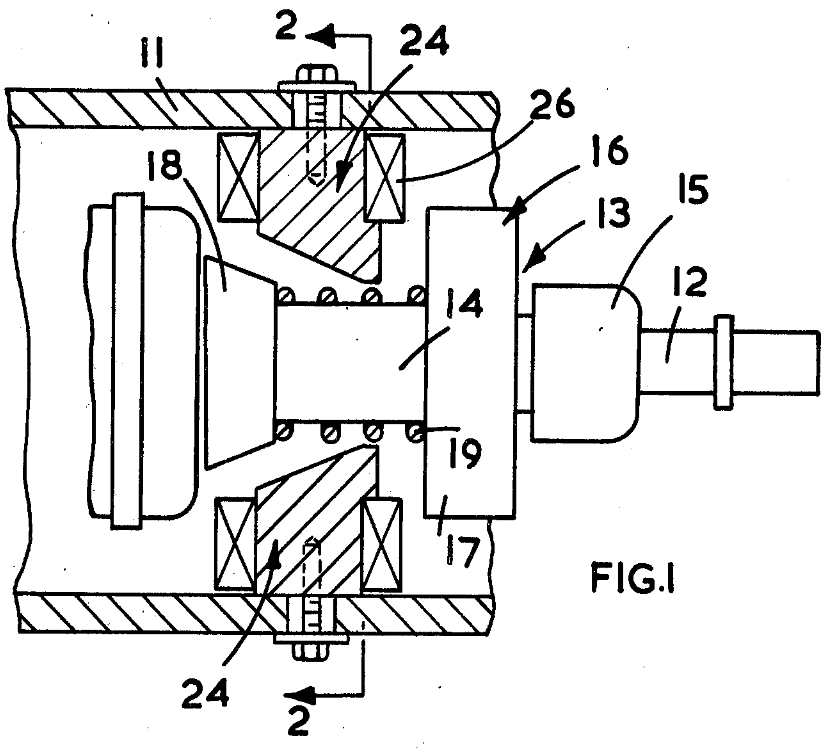
Figure 2:
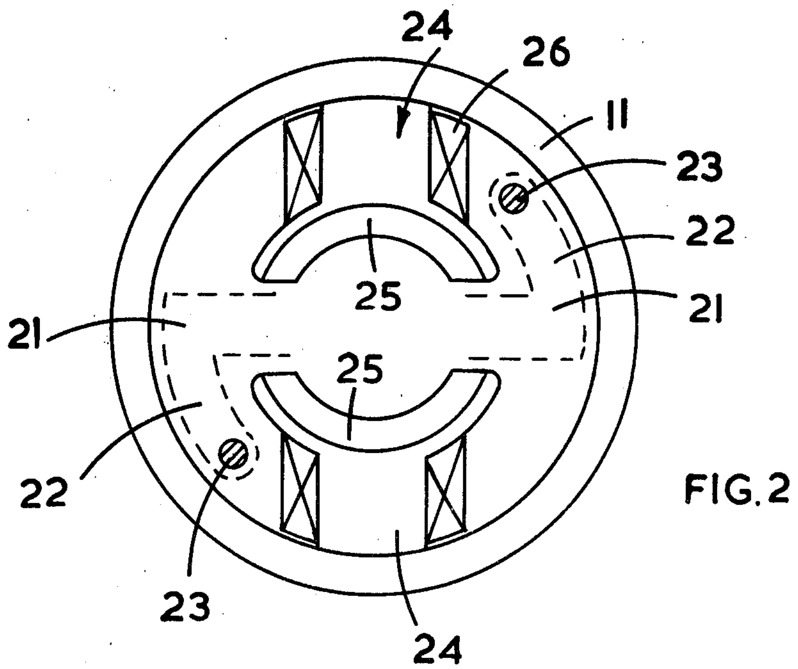

Referring first to FIGS. 1 and 2 of the drawings, the starter motor includes a cylindrical metal casing 11 which at its opposite axial ends carries a pair of bearing parts supporting a rotor shaft 12, the shaft 12 and the casing 11 being co-axial. The shaft 12 is rotatable within the casing, and positioned within the casing and carried by the shaft 12 is a rotor assembly including armature windings. The rotor shaft further carries a commutator connected to the armature windings and supported by the casing is a brush assembly the brushes of which ride on the commutator. Positioned adjacent the rotor assembly, and secured to the inner surfaces of the casing 11 is a field assembly including poles, and field windings. At its end remote from the commutator, the rotor shaft 12 carries a pinion assembly 13 including a sleeve 14 in splined connection with the shaft 12. The sleeve 14 can move axially relative to the shaft 12, but is constrained, by the splined connection, to rotate with the shaft 12. The pinion assembly 13 further includes a pinion 15 mounted on the shaft 12, the pinion 15 being coupled to the sleeve 14 through a unidirectional clutch 16, the clutch 16 being such that rotation of the sleeve 14 in one direction is transmitted to the pinion 15 to drive the pinion 15, while rotation of the pinion in the opposite direction can take place relative to the sleeve 14 as permitted by slipping of the clutch 16. A first part of the clutch 16 is defined by a hollow casing 17 integral with the sleeve 14, and of larger diameter than the remainder of the sleeve 14. At this end remote from the casing 17 the sleeve 14 supports the armature 18 of an electromagnet, the armature 18 being of frusto-conical form. The end of the armature 18 of smallest diameter is presented to the casing 17, and a compression spring 19 acts between the armature 18 and the casing 17. The armature 18 is mounted on the sleeve 14 so as to be capable of axial movement relative thereto, the sleeve 14 including a stop (not shown) against which the armature 18 is urged by the spring 19, the stop defining the limit of axial movement of the armature 18 relative to the sleeve 14 in a direction away from the casing 17.

Integral with the armature 18 and extending radially outwardly therefrom are a pair of diametrically opposite extensions 21 (shown in dotted lines in FIG. 2) and at its outermost end each of the extensions 21 includes an arcuate limb 22, the limbs 22 extending around the inner surface of the casing 11 in the same direction, and each of the limbs being pierced at its free end to receive a guide rod 23. The guide rods 23 guide the armature 18 for axial movement relative to the casing 11, and further serve to prevent rotation of the armature 18 relative to the casing 11. The guide rods 23 are constituted by the shanks of a pair of bolts which extend through an end cap (not shown) of the casing and which serve to secure the end cap to the remainder of the casing 11.

The magnetic structure of the electromagnet of the starter motor includes part of the casing 11, and a pair of electromagnet poles 24 which are bolted to the casing at points diametrically opposite one another. The poles 24 extend radially of the casing 11 towards one another, and at their innermost ends each of the poles 24 includes an integral, arcuate shoe 25. Intermediate the inner surface of the casing 11, and their respective shoes 25, each of the poles 24 is encircled by a respective electromagnet winding 26, the two windings 26 being electrically inter-connected. The arcuate shoes 25 are generally co-axial with the shaft 12 and the armature 18, and the radially innermost surfaces of the shoes 25 are of part conical shape such that the radially innermost surface of each pole shoe is generally parallel with a corresponding surface portion of the armature 18.

Figure 13:
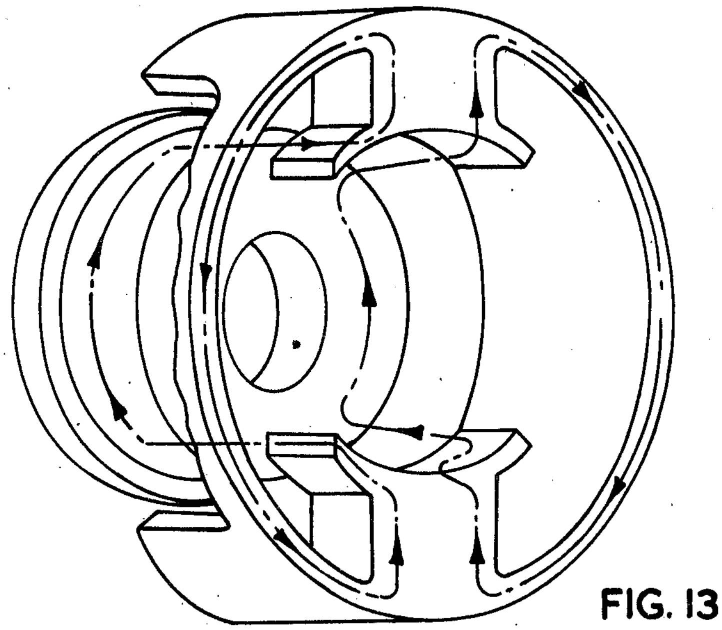
FIG. 13 is a diagrammatic representation illustrating the initial flux flow of the electromagnet arrangements shown in the preceding drawings with the armature in the rest position.

The casing 11 supports a pair of electrical contacts (not shown) connected in the energising circuit of the starter motor. The pair of contacts are so positioned that they can be bridged by a contact carried by one of the limbs 22 of the armature extensions 21, when the armature 18 has been moved through a predetermined axial distance relative to the casing 11. When said pair of contacts is bridged, then the energising circuit of the starter motor is completed, and the shaft 12 is caused to rotate. The pinion assembly 13 is urged to a rest position relative to the shaft 12 and the casing 11 by means of a pair of compression springs encircling the guides 23, and extending between a fixed part of the casing 11 and the limbs 22, the distance through which the armature 18 must be moved to complete the energising circuit of the starter motor being equal to the axial distance through which the pinion 15 must be moved relative to the shaft 12 to fully engage the pinion 15 with the ring gear of the internal combustion engine with which the starter motor is associated. The electrical circuit containing the electromagnet windings 26 is completed by way of an external manually operable switch and it will be appreciated that when the external switch is closed, then the armature 18 is attracted towards the pole shoes 25, the flux path of the electromagnet (as shown in FIG. 13) being from one of the pole shoes generally parallel with the shaft 12 across the air gap defined between the pole shoes and the armature, through the armature at right angles to the direction of movement of the armature, from the armature back across the air gap to the second pole shoe, radially within the second pole, and circumferentially within the portion of the casing 11 which lies in a plane transverse to the direction of movement of the armature 18, back to the first pole. The rating of the spring 19 is such that the resistance to movement of the pinion assembly along the shaft 12 is insufficient to cause an appreciable compression of the spring 19, and so when the armature 18 is attracted towards the shoes 25 then the whole of the pinion assembly is moved axially along the shaft 12.

Assuming that the pinion 15 engages the toothed wheel of the associated engine and the pinion can move fully into engagement with the ring gear of the engine without any obstruction, then immediately full engagement of the pinion 15 and the engine ring gear is achieved, the energising circuit of the starter motor will be completed by way of the contact carried by said one of the limbs 22 of the extensions 21, and the shaft 12 will commence to rotate. The unidirectional clutch 16 is such that rotation of the shaft 12 is transmitted to the pinion 15, and so the starter motor cranks the internal combustion engine to start the engine. However, in the event that when the pinion 15, engages the ring gear of the internal combustion engine, the engagement is of a tooth to tooth nature, then further movement of the pinion 15 axially relative to the shaft 12 will be prevented. The armature 18 is of course still being attracted towards the shoes 25, since the windings 26 will still be energised, and so the spring 19 becomes compressed. The armature 18 continues to move relative to the sleeve 14 until the energising circuit of the starter motor is completed whereupon the shaft 12 begins to rotate carrying the pinion 15 with it. Immediately the pinion 15 starts to rotate the tooth to tooth engagement condition will be removed and the pinion 15 together with the sleeve 14 will be moved axially relative to the armature 18 and the shaft 12 by the spring 19 so that the pinion achieves full engagement with the ring gear of the engine.

The end cap of the casing 11 which is held in position by the bolts constituting the guides 23 carries one of the bearings for the shaft 12 and intermediate that bearing and the remainder of the casing 11 the end cap is cut away to expose the pinion 15, and in use, the ring gear of the engine projects into the end cap through the aperture so as to be in a position where it is engageable by the pinion 15 of the starter motor.

In a modification the splined connection between the sleeve 14 and the shaft 12 is constituted by helically extending splines, rather than by axially extending splines as described above. Thus as the pinion assembly commences to move axially relative to the shaft 12 the helical splined connection will cause the pinion assembly to rotate relative to the shaft 12. Since the pinion 15 is thus rotating as it approaches the ring gear of the internal combustion engine the possibility of a tooth to tooth engagement condition is minimised. In the event that a tooth to tooth engagement condition does occur, then upon energisation of the starter motor the tendency for relative rotation between the shaft 12 and the pinion assembly 13, by virtue of the resistance to movement of the pinion assembly will cause the action of the helical splined connection to aid the spring 19 in moving the pinion into full engagement with the engine ring gear. Moreover, when the engine has been started, there will be a tendency for the pinion to be driven by the ring gear of the engine, and upon de-energisation of the starter motor, the splined connection between the pinion assembly and the shaft 12 will aid the return springs carried by the guides 23 in returning the pinion assembly to its rest position. It will be appreciated that in the event that the pinion assembly is retained in its forward position after the engine has been started then the unidirectional clutch 16 will permit rotation of the pinion 15 relative to the remainder of the pinion assembly, thereby minimising the risk of damage to the starter motor.

Figure 3:
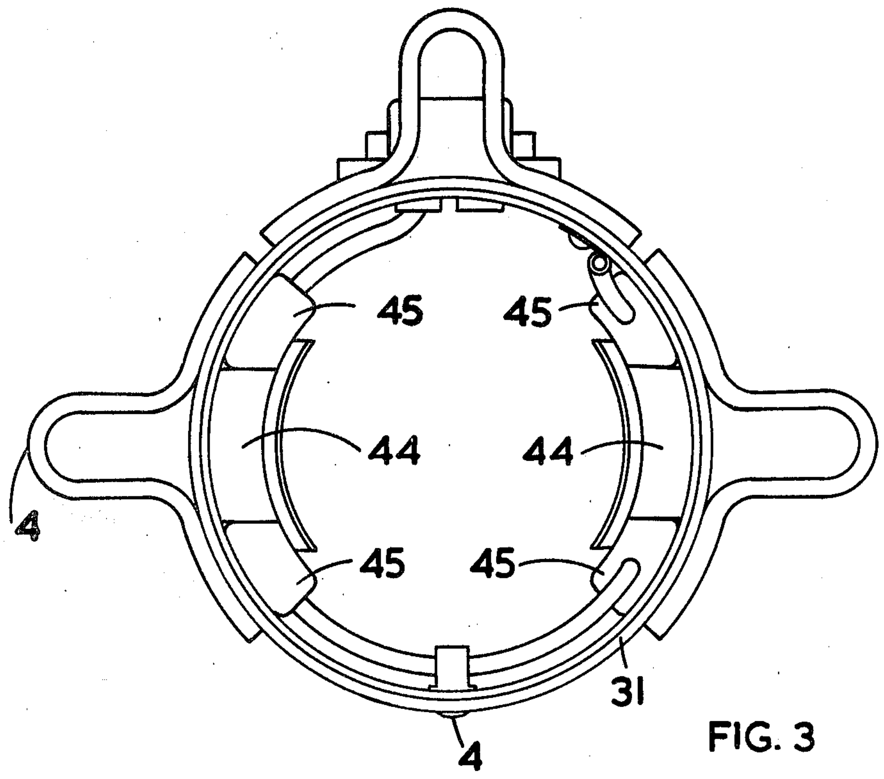
Figure 4:
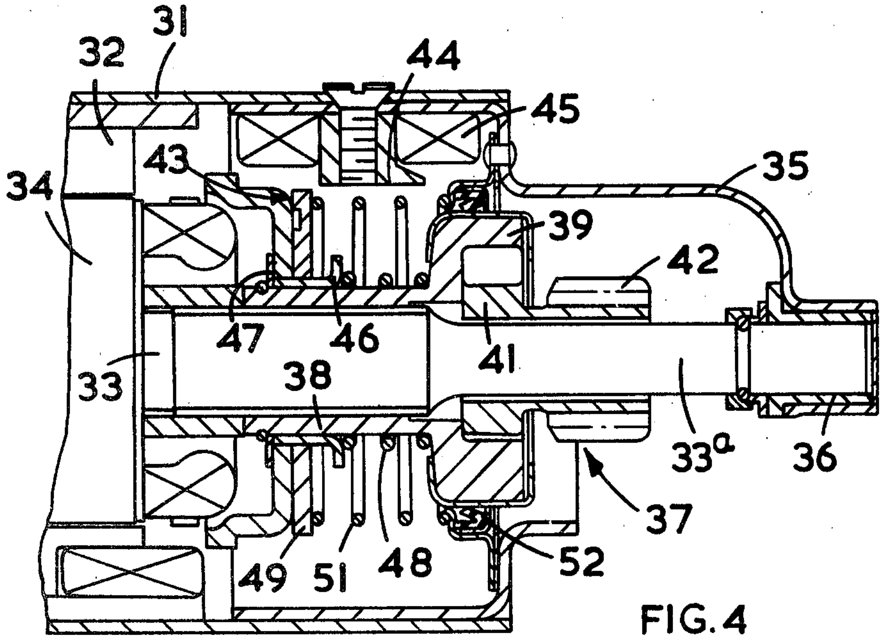

The second form of starter motor as shown in FIGS. 3 and 4 includes a hollow cylindrical metal casing 31 housing a field assembly 32. Mounted for rotation in bearings at each end of the casing is a rotor shaft 33 the rotor shaft 33 supporting within the field assembly 32 a rotor assembly 34 including armature windings. Again one of the bearings 36 of the rotor shaft is carried by an extension 35 of the casing 31, and intermediate the bearing 36 and the rotor assembly 34 the rotor shaft supports a pinion assembly 37. The pinion assembly 37 is mounted on the shaft 33 for rotation therewith, but is capable of limited angular and axial movement relative to the shaft 33 as permitted by a helically splined coupling between the shaft 33 and a sleeve 38 of the pinion assembly 37. At one end the sleeve 38 defines the outer part 39 of a unidirectional clutch, the inner part 41 of which has integral therewith a pinion gear wheel 42, the part 41 and the pinion gear wheel 42 being supported by a plane portion **33*a* of the shaft 33. Axial movement of the pinion assembly 37 moves the pinion gear wheel 42 from a retracted position (as shown in FIG. 4) to an operative position wherein the pinion gear wheel 42 is adjacent the bearing 37 and is engaged with the ring gear of an internal combustion engine with which the starter motor is associated in use. In order to move the pinion assembly axially there is provided an electromagnet including an armature 43 which forms part of the pinion assembly 37, and which is guided for linear movement by the pinion assembly 37. The electromagnet further includes a magnetic structure including part of the casing 31 and a pair of poles 44 secured to the casing 31. The poles 44 are secured to the casing by screws, and as shown in FIG. 3, extend radially inwardly towards one another. The poles 44 are diametrically opposite one another, and the radially innermost surfaces of the poles are cylindrical, the two cylindrical surfaces constituting parts of the surface of an imaginary cylinder coaxial with the rotor shaft. The electromagnet further includes a pair of electromagnet windings 45 encircling the poles 44** respectively and electrically interconnected.

Mounted on the sleeve 38 for axial movement relative thereto, but for rotation with the sleeve 38, is a collar 46 which is urged against a stop 47 by a spring 48. The spring 48 acts at one end against the collar 46 and at its other end against the part 39. Rotatably mounted on the collar 46 is the armature 43 and a pressure plate 49 which is welded to the armature 43 and against which abuts one end of a spring 51. The spring 51 urges the armature 43 to the left as shown in FIG. 4, into engagement with the stop 47 and also resists rotation of the armature relative to the casing. The armature 43 includes an outer cylindrical surface coaxial with the rotor shaft 33, and of diameter slightly less than the diameter of the cylindrical surfaces of the poles 44. Thus when the electromagnet windings 45 are energised the armature 43 is attracted towards the pole shoes 44 and so moves the pinion assembly axially in a direction to move the pinion to its operative position. The flux path of the electromagnet is similar to that described above, and is again represented by FIG. 9, the flux path being from one of the poles 44 generally parallel with the rotor shaft across the air gap to the armature 43 through the armature 43 generally at right angles to the direction of movement of the armature 43 back across the air gap to the other of the pair of poles 44, and from the second pole 44 back to the first pole 44 by way of the material of the casing 31, the arcuate return path within the casing 31 of course being circumferential with respect to the arrangement, in a plane transverse to the direction of movement of the armature 43. The armature 43 can enter between the pole shoes 44 by virtue of the difference in diameter between the external diameter of the armature 43 and the radius of curvature of the cylindrical surfaces of the poles 44, and this dimensional difference is maintained as small as possible, in order to minimise the air gap which occurs between the poles and the armature in use. Movement of the pinion assembly takes place against the action of the spring 51, which abuts at its end remote from the plate 49 against part of a seal 52 secured to the casing 31 and engaging the portion 39 of the pinion assembly to minimise ingress of dirt into the starter motor. Energisation of the starter motor, and energisation of the windings 45 is controlled by two sets of contacts of a key operated switch which is operated by the controller of the device utilizing the internal combustion engine. Initial rotation of the switch towards an engine start position energises the windings 45, so that the pinion is moved towards its operative position to engage the toothed wheel of the engine to be started. Further movement of the key into the engine start position then energises the starter motor so that the rotor shaft 33 starts to rotate. Owing to the helical splined connection between the sleeve 38 and the rotor shaft 33, then as the pinion assembly is moved towards its operative position while the shaft 33 is still stationary, the pinion assembly is caused to rotate thereby minimising the risk that the pinion will meet the ring gear of the engine to be started in a tooth to tooth engagement condition. Additionally when the rotor shaft 33 commences to rotate the inertia of the pinion assembly initially resists rotation of the pinion assembly, and thus the helical splined connection between the sleeve 38 and the rotor shaft 33 causes the pinion assembly to be driven towards its operative position. In the event that a tooth to tooth engagement condition does occur between the pinion gear wheel 42 and the ring gear of the engine to be started, then the pinion assembly will be held against movement in an axial direction. The armature will also be held against axial movement since the spring 4S is sufficiently strong to overcome the attraction of the poles 44. However, the interval of time between energisation of the windings 45 and energisation of the starter motor to cause rotation of the rotor shaft 33 is very small and so almost immediately the tooth to tooth condition arises the starter motor will be energised and the shaft 33 will begin to rotate. The pinion assembly will rotate with the shaft 33 by virtue of the splined connection, and so the tooth to tooth condition is rapidly removed. Thereafter, armature, which is still being attracted by the poles 44, aids the action of the helical splined connection in driving the pinion assembly towards its operative position so that the pinion 42 achieves full engagement with the ring gear of the engine. The spring 48 acts as a buffer to absorb movement which occurs in the condition where the engine being cranked fires while the winding 45 is still energised. In this condition the firing of the engine tends to throw the pinion suddenly out of engagement with the engine ring gear, and the spring 48 acts as a buffer to absorb this movement.

When the engine starts to run, the speed of the engine ring gear wheel may well exceed the speed of the rotor shaft 33 so that in the absence of the unidirectional clutch 39, 41 the engine will drive the starter motor. However the unidirectional clutch permits the pinion 42 to rotate relative to the sleeve 38 in such circumstances. Immediately the engine starts the controller will normally release the starter key to permit the starter switch to return to its off position thereby breaking the energisation circuit of the electromagnet windings 45 and de-energising the starter motor. When the start switch returns to its off position the armature 43 is no longer attracted towards the poles 44, and the pinion assembly is urged towards its retracted position by the spring 51. In addition, the inertia of the pinion assembly causes the pinion assembly to tend to rotate after the rotor shaft 33 has ceased to rotate, and the action of the helical splined connection between the sleeve 38 and the rotor shaft 33 also moves the pinion towards its retracted position.

Figure 5:
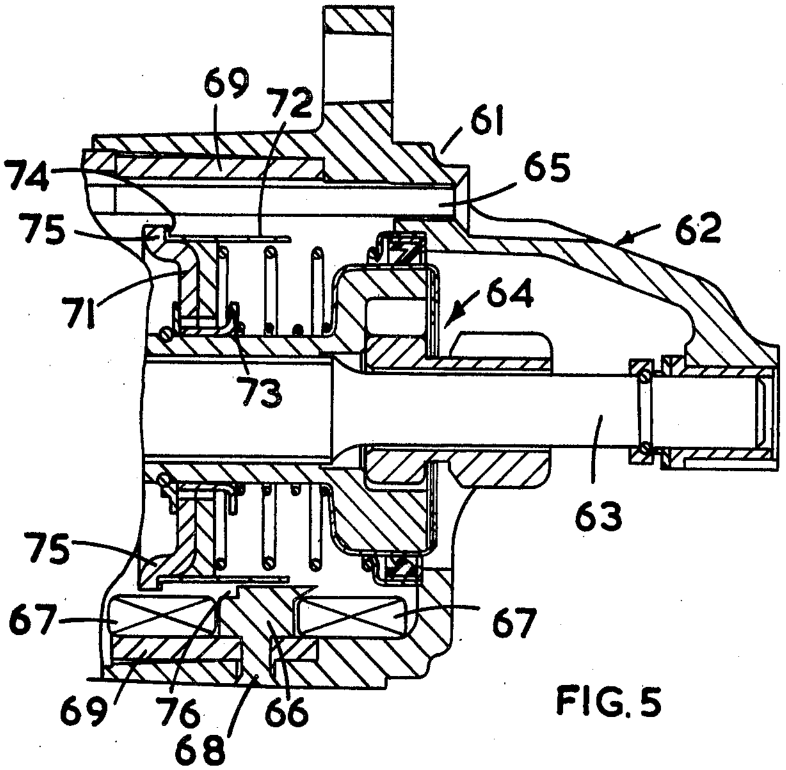

In the third form of starter motor shown in FIG. 5, the starter motor casing includes a detachable cast end bracket 61 having a bearing supporting extension 62 integral therewith. One end of the rotor shaft 63 of the starter motor is received in a bearing carried by the extension 62 and a pinion assembly 64 similar to the pinion assembly 37 of the above described arrangement is carried by the shaft 63. The end bracket 61 is held in position by a pair of bolts one of which is shown at 65 and which extend through the end bracket 61 and are received either in the poles of the field assembly of the starter motor, or in captive nuts carried by the casing. The electro-magnet for moving the pinion assembly towards its operative position includes a magnet structure having a pair of electromagnet poles (one of which is shown at 66) and which, as with the previous examples, extend diametrically opposite one another, radially inwardly from the inner surface of the end bracket, and which are each encircled by a respective electromagnet winding 67. Each of the poles 66 has an integral spigot 68 which extends through a corresponding aperture in a mild steel sleeve 69 and through the wall of the end brackets 61, the spigots 68 being deformed at the exterior of the end bracket 61 to retain the poles 66 and the sleeve 69 in position relative to the end bracket 61. The sleeve 69 and the adjacent part of the end bracket 61 constitute part of the magnetic structure of the electromagnet, and the sleeve 69 is provided to add magnetic material to the casing to increase the efficiency of the return path of the magnetic circuit of the electromagnet. However, it is to be appreciated that the sleeve 69 itself contains sufficient material to constitute an efficient magnetic return path then the end bracket 61 could be formed from non-magnetic material, for example, from a zinc die-casting alloy. In such an arrangement of course the nonmagnetic causing would form no part of the magnetic structure of the electromagnet.

As with the above described arrangement the faces of the poles 66 presented to the pinion assembly 64 are part-cylindrical, and are co-axial with the shaft 63 and the pinion assembly 64. The electromagnet of the starter motor again includes an armature 71 associated with the pinion assembly, but the armature 71 differs from its counterpart in the above described arrangement in that the armature 71 carries a brass sleeve 72 co-axial therewith. The outer diameter of the brass sleeve is slightly less than the diameter of the part-cylindrical faces of the poles 66, and the axial length of the sleeve 72 is such that in the retracted position of the pinion assembly 64 the sleeve 72 engages the cylindrical faces of the poles 66 as a sliding fit. Additionally, the central aperture of the armature 71 is of sufficiently large diameter in relation to the external diameter of the collar 73, to ensure that there is a clearance between the armature 71 and the collar 73. Thus the armature 71 is maintained in a plane transverse to the axis of the rotor shaft 63 and the pinion assembly 64, and is guided for linear movement parallel to the axis of the shaft 63, by the engagement of the sleeve 72 with the part-cylindrical faces of the poles 66. The sleeve 72 and the poles 66 resist any tendency there may be for the armature to tilt relative to the pinion assembly, for example, owing to slight imbalance in the effects of the two poles 66.

At its end remote from the poles 66 the sleeve 72 is provided with a peripheral outwardly directed flange 74 which abuts the peripheral outwardly extending flange 75 of the armature 71. Thus the flange 74 of the brass sleeve 72 acts as a non-magnetic spacer between the armature 71 and the poles when the armature is attracted towards the poles 66 to move the pinion assembly to its operative position. The flange 74 of the brass sleeve prevents the flange 75 of the armature making physical contact with the poles, and so aids disengagement of the armature from the poles when the electromagnet is de-energised.

The edges of the poles 66 which are presented to the armature 71 are cut away to define a step 76 which receives the flanges 74, 75 of the sleeve 72 and armature 71 respectively, in the operative position of the pinion assembly. The step 76 in effect causes that portion of the pole which is presented to the armature to constitute a pair of poles spaced apart in the direction of movement of the armature. The effect of this arrangement is to render the magnetic attraction between the poles and the armature more consistent throughout the range of movement of the armature, and it will be appreciated that if desired more than one step can be provided on each of the poles, it being noted that each step on the poles will have a mating projecting portion on the periphery of the armature and sleeve 72.

The operation of the starter motor shown in FIG. 5 is substantially identical to that described with reference to FIG. 4, the pinion assembly being coupled to the shaft 63 by way of either axially extending splines, or by way of helically extending splines where the provision of rotation of the pinion assembly relative to the shaft 63 during initial axial movement of the pinion assembly is required. The flux path of the electromagnet of the arrangement shown in FIG. 5, as with the arrangement shown in FIG. 4 will conform generally to that shown in FIG. 13 it being appreciated that the sleeve 72 being brass, is of course non-magnetic.

Figure 6:
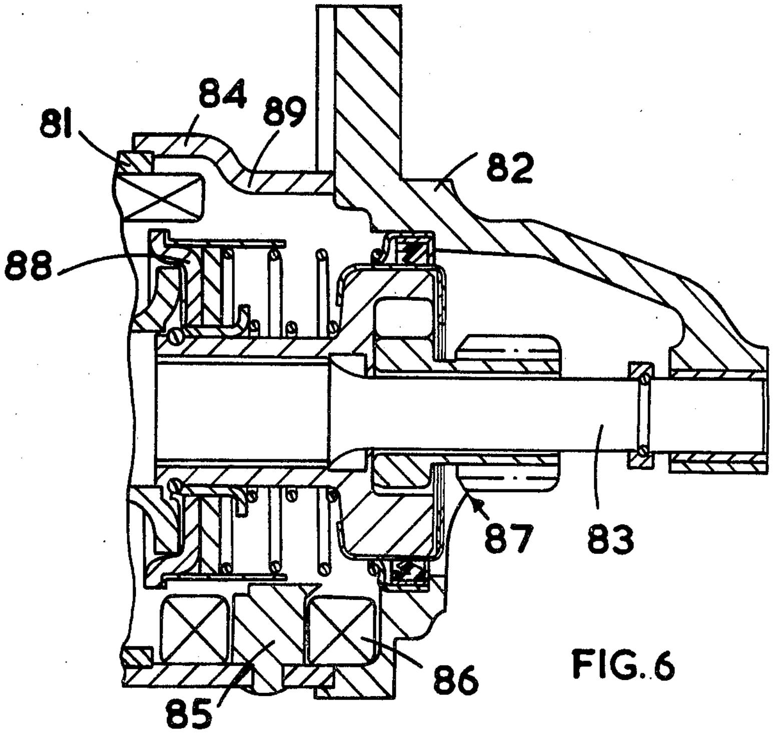

In the modification shown in FIG. 6 the overall length of the starter motor has been reduced, and the casing 81 of the starter motor which carries the field assembly of the starter motor is spaced from the die-cast and bracket 82 which carries one of the bearings of the rotor shaft 83, by a mild steel yoke 84 which constitutes part of the magnetic structure of the electromagnet of the starter motor. The opposite axial ends of the yoke 84 engage respectively the casing 81 and the end bracket 82, and bolts which extend externally of the casing, and which engage both the casing 81 and the end bracket 82 are used to clamp the components 81, 82, 84 in position relative to one another. A pair of electromagnet poles (one of which is shown at 85) and which are substantially identical to the poles 66 described above are riveted to the yoke 84 diametrically opposite one another. An electromagnet winding 86 encircles each of the poles 85 and so that the field assembly of the starter motor can project within the confines of the yoke 84 at a pair of diametrically opposite points the poles 85 and their windings 86 are rotated through 90° about the axis of the starter motor so that the field arrangement of the starter motor can project within the yoke 84 between the poles 85. The pinion assembly 87 and armature assembly 88 of the starter motor is identical with that described in connection with FIG. 5, and again the operation of the starter motor is as described above. The mild steel yoke 84 of course provides the flux return path of the electro-magnet, the flux flowing within the material of the yoke 84 such that the return path lies transverse to the direction of movement of the armature assembly 88. If desired, the yoke 84 can be provided between the poles 85, with a pair of diametrically opposite indented regions 89 which constitute consequence poles of the electromagnet. Such consequence poles are merely poles of the electromagnet which do not have windings associated directly with them, but the poles nevertheless serving to channel the flow of magnetic flux within the magnetic structure of the electromagnet, to minimise flux leakage.

Figure 7:
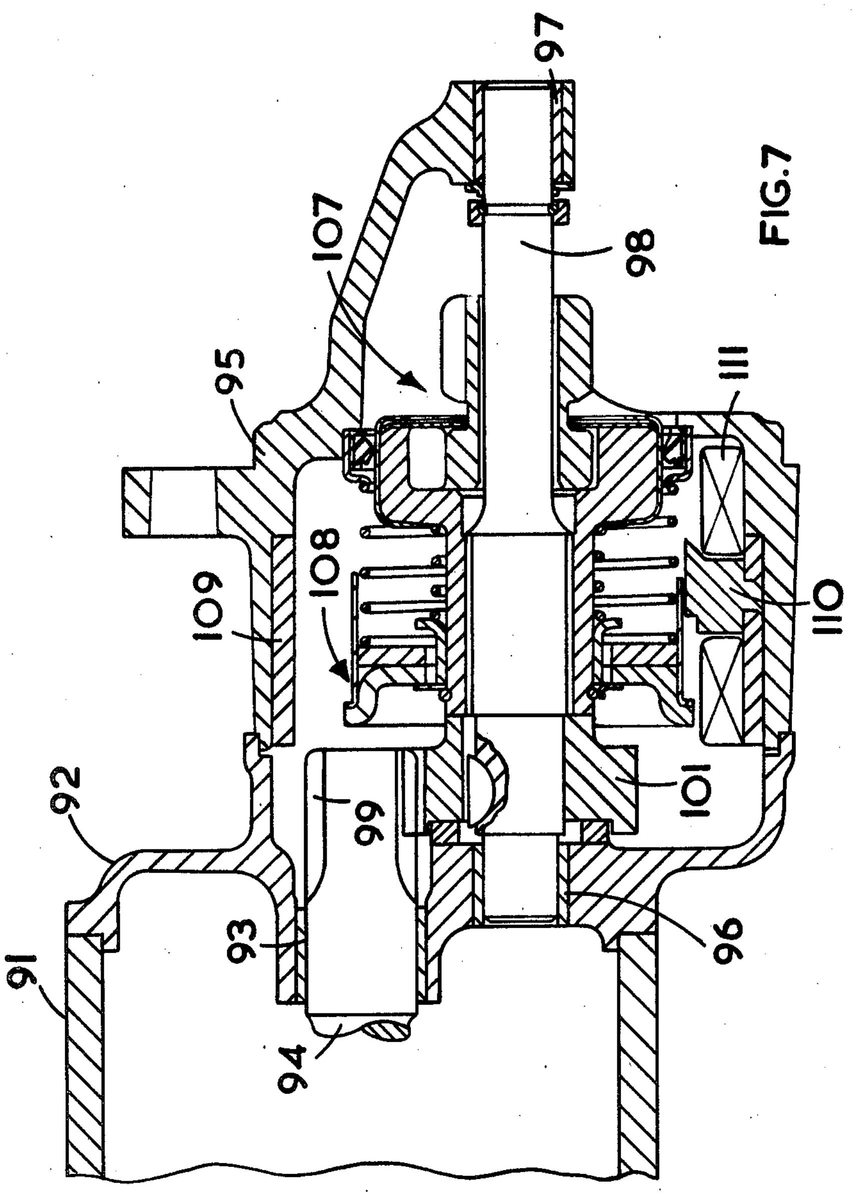

FIG. 7 shows a starter motor where the casing includes a portion 91 housing the field assembly of the starter motor a cover 92 closing one end of the casing 91 and defining a bearing 93 within which one end of the rotor shaft 94 of the starter motor is received, and an end cap 95 engaged with the cover 92. The cover 92 and the end cap 95 carry bearings 96, 97 respectively which rotatably support a pinion shaft 98 having its axis parallel to, but spaced from the axis of the rotor shaft 94. The rotor shaft 94 extends from the casing part 91 through the cover 92 and is formed at its free end with gear teeth 99 which mesh with the teeth of a gear wheel 101 mounted on the shaft 98. The gear wheel 101 is keyed to the shaft 98 and so the shaft 98 is rotated by the shaft 94, but in the opposite direction to the shaft 94, by way of the gear connection constituted by the gear teeth 99 on the shaft 94 and the gear wheel 101. Mounted on the pinion shaft 98 between the gear wheel 101 and the bearing 97 is a pinion assembly 102 substantially identical to the pinion assembly 64 described with reference to FIG. 5, and associated with the pinion assembly 107 is an electromagnet armature assembly 108 substantially identical to the assembly 71, 72 of FIG. 5. As with the arrangement shown in FIG. 5, the end cap is provided internally with a cylindrical yoke 109 which is formed from mild steel, and which is conveniently an interference fit in the end cap. The yoke 109 carries a pair of radially inwardly directed, diametrically opposed poles 110 and where the end bracket 95 is formed from non-magnetic material, then the sleeve or yoke 109 requires to contain sufficient material to provide an efficient flux return path for the electromagnet. Encircling each of the poles 110 is an electromagnet winding 111 and the operation of the electromagnet of the arrangement shown in FIG. 7 in moving the pinion assembly is substantially identical to that described with reference to FIG. 5.

Turning now to the arrangement shown in FIG. 8 the starter motor again includes a main casing part 121 which houses the field assembly and rotor assembly of the starter motor. Closing the end of the casing part 121 is a cover 122 and trapped between the cover 122 and an end bracket casting 123 is a mild steel cylindrical yoke 124. A pair of bolts (one of which is shown at 125) have their heads engaged with the casing 123 and extend through the casing 123 within the yoke 124, through bores in the cover 122, and have screw-threaded end portions received either in corresponding bores in the poles of the field assembly of the starter motor within the casing part 121, or engage captive nuts secured to the casing part 121. The bolts 125 clamp the cover 122 and the yoke 124 between the casting 123 and the casing part 121, and the axial ends of the components 121, 122, 123 and 124 are shaped to mate with one another. Thus the casting 123 is recessed to receive one end of the yoke 124 the other end of the yoke 124 itself receiving a circular rib upstanding from the end face of the cover 122. The opposite end of the cover 122 is recessed, and receives a portion of the casing 121 of reduced diameter. In order to ensure that the casing 122 the end cap 123 and the yoke 124 are secured together in the correct angular alignment the casting 123 is provided with a projection **123*a* which engages in a corresponding recess in the end of the yoke 124, and the cover 122 is provided with a radial rib 122*a* which is received in a recess in the end of the yoke 124 remote from the casting 123. The cover 122 is provided with a central aperture which receives a bearing 126 rotatably supporting a stub shaft 128 of a planet gear wheel carrier 127. The carrier 127 lies within the enclosure defined by the cover 122 and the casing part 121 and carries three planet shafts (one of which is shown at 129). The three planet shafts extend parallel to the rotor shaft 131 of the starter motor and are equi-angularly spaced around the periphery of the shaft 131. The shafts 129 each carry a planet gear wheel 132 and the three planet gear wheels 132 mesh with teeth provided on the inner periphery of an annular gear ring 133. The gear ring 133 is carried by the cover 122, and is held against rotation relative thereto by the bolts 125 which extend through bores in the ring 133. The centre region of the carrier 128 is provided with an axial blind bore housing a bearing 134 which rotatably supports an end region 135 of the rotor shaft 131. The end region 135 is of reduced diameter, and between the end region 135 and the remainder of the shaft 131 there is defined a sun gear wheel 136. The sun gear wheel 136 meshes with the three planet gear wheels 132 and so as the rotor shaft 131 rotates the planet gear wheels 133 orbit the sun gear 136, the carrier 128 rotating about the axis of the rotor shaft 131, in the direction in which the rotor shaft 131 rotates, and at an angular speed determined by the angular speed of the rotor shaft 131, and the gear ratio of the epicyclic gear defined by the sun gear wheel 136 the planet gear wheels 132 and the annular gear ring 133**.

Figure 8:
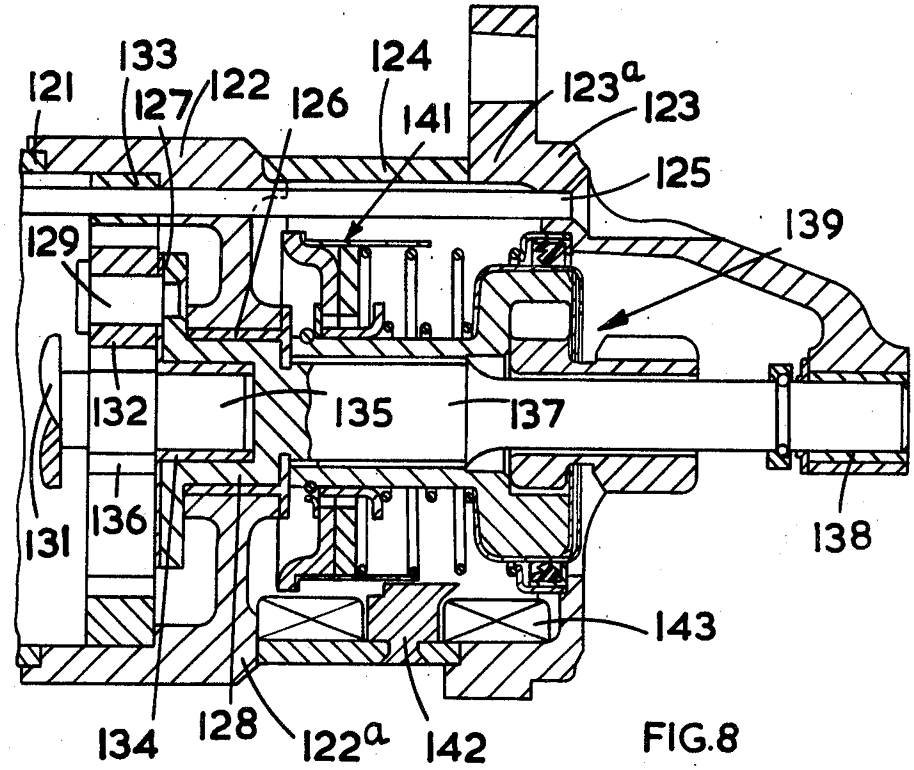

Coaxial with the planet carrier 128 and rigedly secured thereto is a pinion shaft 137 the end of which remote from the carrier 128 is received in a bearing 138 carried by an integral extension of the casting 123. The axis of the pinion shaft 137 is co-extensive with the axis of the rotor shaft 131 and the pinion shaft 137 is driven by the rotor shaft 131. The shaft 137 is equivalent to the end portion of the rotor shaft 63 in the arrangement shown in FIG. 5, and supports a pinion assembly 139 substantially identical to the pinion assembly 64. An electromagnet armature assembly 141 substantially identical to the assembly 71, 72 is associated with the pinion assembly 139 and carried by the yoke 124 are a pair of electromagnet poles (one of which is shown at 142). The poles 142 are substantially identical to the poles 66 of the arrangement shown in FIG. 5 but are riveted solely to the yoke 124 and not to any part of the end bracket casting 123. The poles 142 are diametrically opposite one another and each is encircled, within the yoke 124, by a respective electromagnet winding 143. The operation of the electromagnet of the arrangement shown in FIG. 8 is identical to that described with reference to the arrangement shown in FIG. 5.

In a modification of the starter motor arrangement shown in FIG. 7 the shaft 98 extends at right angles to the rotor shaft 94, rather than parallel to the shaft 94. The cover 92 is modified to receive the end bracket casting 95 at right angles to the axis of the casing part 91, and the gear teeth 99 on the shaft 94 and the gear wheel 101 are formed as bevel gears arranged to transmit rotation of the rotor shaft 94 to the pinion shaft 98. It will be appreciated, that by modifying the cover 92 and the gear connection between the shafts 94 and 98 accordingly a range of starter motors can be provided where the shaft 98 lies in different angular orientations with respect to the shaft 94.

Figure 9:
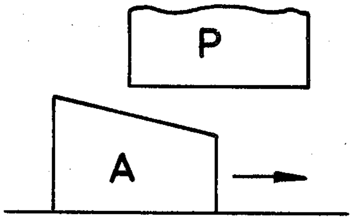
Figure 10:
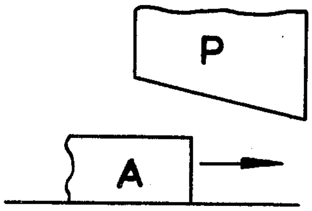
Figure 11:
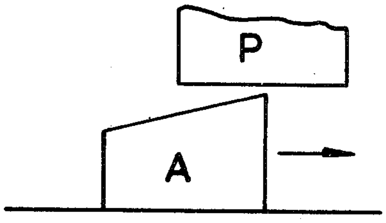
Figure 12:
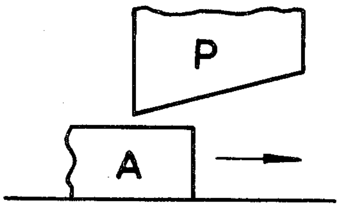

Described above are several pole and armature forms and it will be appreciated that the form of the pole and armature will be governed at least in part by the requirements of the electromagnet. FIGS. 9 to 12 show four further arrangements wherein the poles and the armature are not of corresponding shapes. FIGS. 9 and 10 show arrangements where the armature A and the poles P (only one of which is shown) are so shaped that the attraction of the armature A to the poles P increases as the armature enters further between the poles. FIGS. 11 and 12 show opposite arrangements where there is a decrease in attraction.

In all of the starter motors described above the field system of the starter motor is a wound field. However, it is to be 1 appreciated that in any of the starter motor constructions described above the field arrangement could be permanent magnet field arrangement. In a starter motor having a permanent magnet field arrangement, the rotor shaft will rotate at greater angular speeds than for a wound field arrangement. if the permanent magnet field starter motor is to operate efficiently. Thus the starter motor constructions described with reference to FIGS. 7 and 8 lend themselves well to permanent magnet field starter motors since their geared drive transmissions between the rotor shaft and the pinion shaft can be chosen to provide a speed reduction, so that the pinion shaft can rotate more slowly than the rotor shaft.

Figure 14:
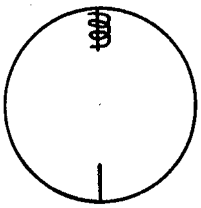
FIGS. 14 to 24 are diagrammatic representations respectively of electromagnet pole arrangements in accordance with further examples of the invention.
Figure 15:
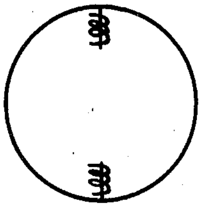
Figure 16:
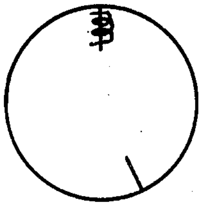
Figure 17:
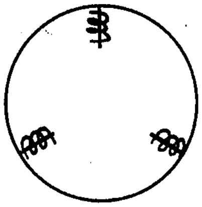
Figure 18:
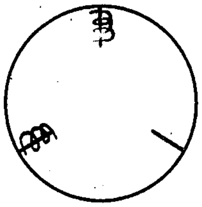
Figure 19:
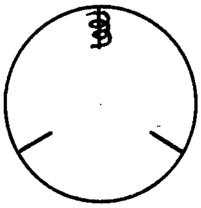
Figure 20:
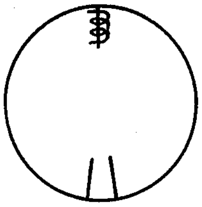
Figure 21:
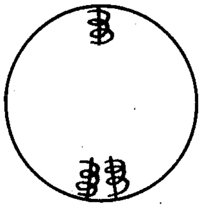
Figure 22:
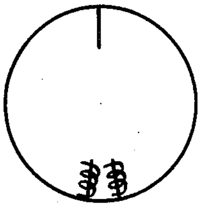
Figure 23:
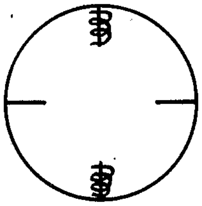
Figure 24:
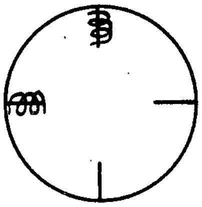

In all of the arrangements described above it will be noted that the electromagnet of the starter motor has a pair of diametrically opposed poles each of which has a respective electromagnet winding associated therewith. FIGS. 14 to 24 illustrate a series of possible pole arrangements. FIG. 15 illustrates the arrangement described above where the electromagnet has a pair of diametrically opposite individually wound poles. The remaining ten figures show alternative pole arrangements. In FIG. 14 the two poles are diametrically opposite on another but only one of the poles is wound. The second pole constitutes a consequence pole that is to say a pole which does not carry a winding, but which nevertheless guides and channels the magnetic flux to minimise flux leakage. In the arrangement shown in FIG. 15 where both poles are wound the poles are of course wound so that they are of opposite magnetic polarity. Returning to the arrangement shown in FIG. 14 the poles will also be of opposite polarity since the polarity induced in the consequence poles by the winding of the wound pole will of course be opposite to that induced in the wound pole. In the arrangement shown in FIG. 16 the consequence pole and the wound pole are not diametrically opposite one another and diverge from the diametric position sufficiently, for example, to allow through bolts to pass adjacent the poles from the end bracket casting to the main casing of the starter motor. In the arrangement shown in FIG. 19 there are three poles equi-angularly spaced around the axis of the armature. Only one of the poles is wound, the other two poles being consequence poles. FIG. 18 shows a tripolar arrangement with two of the poles wound, and in such an arrangement the windings of both poles would be such that the poles have the same induced polarity, magnetic flux flowing by way of the armature in use from both poles to the consequence pole. In the arrangement shown in FIG. 17 all three poles are wound, and the windings of two of the poles will be such as to induce one polarity while the winding of the third pole induces an opposite polarity. The arrangements shown in FIGS. 20, 21 and 22 are in fact bipolar arrangements with one of the poles split to permit passage through the electromagnet of, for example a through bolt. The two parts of the split pole are magnetically interconnected by the part of the magnetic structure of the electromagnet which carries the poles. In FIG. 20 the pole opposite the split pole is wound while the split pole is a consequence pole, in the arrangement shown in FIG. 21 both the split pole and the pole opposite are wound it being noted that both limbs of the split pole are wound. In the arrangement shown in FIG. 22 only the split pole is wound the opposite pole being the consequence pole, and again both limbs of the split pole are wound. The arrangement shown in FIGS. 23 and 24 are four pole arrangements, i.e., having first, second, third, and fourth poles 201–204, respectively, and in FIG. 23 a pair of diametrically opposite poles are wound, the windings being arranged to induce the same polarity in their respective poles. In FIG. 24 a pair of adjacent poles are wound and the windings are arranged to induce in their respective poles the same or the opposite magnetic polarity. It is to be appreciated, that the arrangements shown in FIGS. 14 to 24 are by no means exhaustive, and the number of poles used, the positioning of the poles, and the winding of the poles or sets of poles can be varied to suit the particular requirements of the electromagnet.

Figure 25:
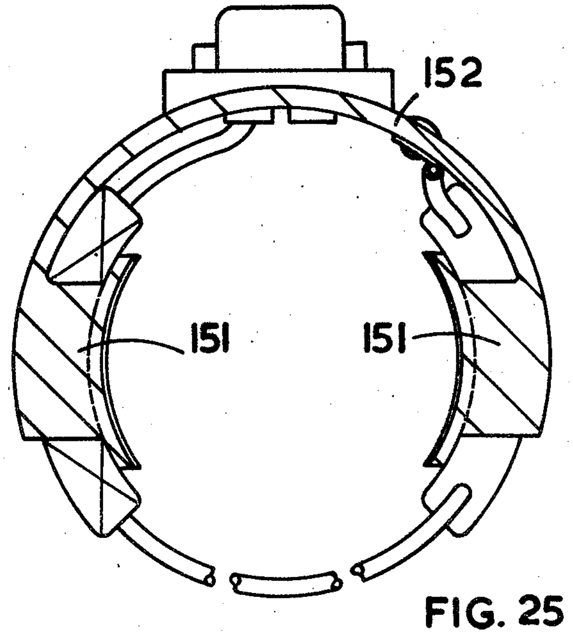
FIG. 25 is a transverse sectional view of part of a starter motor illustrating another example of the invention.

In every arrangement described above the magnetic structure of the electromagnet includes a number of poles magnetically interconnected by a hollow cylindrical member, either a yoke member, or a portion of the casing of the starter motor. It is to be noted however that it is not essential that the member interconnecting the poles is a closed loop, and as shown in FIG. 25, the poles 151 can be interconnected on one side only of the axis of the arrangement by a bridging member 152. In such an arrangement the magnetic flux still flows between the poles in a plane transverse to the direction of movement of the armature of the electromagnet, by way of the material of the bridging member 152. For convenience, in the starter motor arrangements described above the member which magnetically interconnects the poles, be it the casing, a cylindrical yoke, or the bridging strip 152, is curved to conform to the casing shape of the starter motor. It is to be appreciated however that the shape of the magnetic interconnecting member can take a variety of different forms depending on the nature of the environment in which the electromagnet will be used. For example, the bridging member need not be arcuate, but could be of a rectangular, or part rectangular nature.

In the starter motor examples described above there are two basic forms of switching. There is a first form where the electromagnetic is energised under the control of a manually operable switch, and the starter motor itself is then energised. when the pinion reaches a predetermined position relative to the casing of the starter motor, and a second type where both energisation of the electromagnet and energisation of the starter motor itself are controlled by the same manually operated switch, the starter motor being energised fractionally later than the electromagnet by virtue of spacing of the associated fixed contacts of the switch. It is envisaged that either form of switching can be used for each of the starter motor arrangements described above, and it will be appreciated that any other suitable form of switching can be employed. Furthermore, in electromagnet arrangements where there is more than one electromagnet winding then it is to be appreciated that the electromagnet windings can be connected either in series or in parallel.

Throughout the wide range of examples given above the electromagnet winding or windings are described as encircling their respective poles. It is of course not essential that the winding actually encircles its respective pole, but merely that the winding or windings encircle some component of the iron path of the electromagnet. For example, considering the arrangement shown in FIG. 25 a single winding equivalent to the pair of windings shown encircling the poles 151 could be positioned on the bridging member 152 intermediate the poles 151. The winding would encircle the bridging member and thus would induce a flow of flux in the magnetic structure constituted by the bridging member and the poles exactly similar to the flow of flux induced by the two separate windings wound around respective poles, or indeed to that induced by a single winding encircling one of the poles.

It is to be appreciated, that in any of the starter motor arrangements described above the drive connection between the pinion assembly and the shaft supporting the pinion assembly can be an axial splined connection, or a helical splined connection, it being noted that the helical splined connection provides the feature of rotation of the pinion assembly relative to the supporting shaft during axial movement of the pinion assembly relative to the shaft. Moreover, in view of the arrangements described above the unidirectional clutch utilized in the pinion assembly is a roller clutch. It is to be appreciated that other forms of overruning unidirectional clutch could be utilized, and it is envisaged that a friction plate clutch could also be utilized. The descriptions given above of the operation of starter motors where the pinion assembly is coupled to the driven shaft by way of helical splined connection have been simplified somewhat. In practice the armature of the arrangement is mounted on a collar and abuts against one end of the collar when the electromagnet is energised. The attraction of the armature towards the poles of the electromagnet moves the collar and so of course the remainder of the pinion assembly. When the armature engages the poles of the electromagnet the pinion has not reached full engagement with the engine ring gear and energisation of the starter motor causes the helical splined connection to move the pinion into full engagement. In so doing the collar is moved relative to the armature so that during cranking the armature, which does not rotate, is not abutting the end of the collar which does of course rotate. The pinion assembly is prevented from passing the full engagement position by a stop member on the driven shaft. The positioning and tolerances of the components are so chosen that the armature is mid way along the collar during cranking thus minimising generation of heat and wearing of the collar and the armature.

We claim:

1. A starter motor, for an internal combustion engine, comprising an electric motor, a shaft rotated by said motor, a pinion gear wheel carried by said shaft, the pinion gear wheel being rotated with the shaft, and being axially movable relative thereto between an operative position and a rest position, and an electromagnet comprising an armature coupled to the pinion gear wheel and guided for movement parallel to the shaft, first and second electromagnet poles spaced apart around said shaft, the first and second poles being spaced from the armature in the rest position thereof in the direction of movement of the armature, a member magnetically interconnecting the first and second poles, and an electromagnet winding which when energized induces a flow of magnetic flux in the flux path of the electromagnet, the flux path of the electromagnet being from the first pole to the armature, within the armature laterally relative to said shaft, from the armature to the second pole, and from the second pole within said member back to the first pole, wherein said first and second poles lie in a common plane transverse to the axis of said shaft, third and fourth electromagnet poles, the third and fourth poles being spaced from the first and second poles in said plane and magnetically connected to the first and second poles by said member, and those portions of the poles presented to the armature being stepped, the periphery of the armature being shaped to mate with the stepped form of the poles.

2. A starter motor, for an internal combustion engine, comprising an electric motor, a shaft rotated by said motor, a pinion gear wheel carried by said shaft, the pinion gear wheel being rotated with the shaft, and being axially movable relative thereto between an operative position and a rest position, and an electromagnet comprising an armature coupled to the pinion gear wheel and guided for movement parallel to the shaft, first and second electromagnet poles spaced apart around said shaft, the first and second poles being spaced from the armature in the rest position thereof in the direction of movement of the armature, a member magnetically interconnecting the first and second poles, and an electromagnet winding which when energized induces a flow of magnetic flux in the flux path of the electromagnet, the flux path of the electromagnet being from the first pole to the armature, within the armature laterally relative to said shaft, from the armature to the second pole, and from the second pole within said member back to the first pole, wherein said first and second poles lie in a common plane transverse to the axis of said shaft, a second electromagnet winding, both windings encircling respective poles, a third electromagnet winding, and those portions of the poles presented to the armature being stepped, the periphery of the armature being shaped to mate with the stepped form of the poles.

3. A starter motor as claimed in claim 2, in which the third electromagnet winding encircles said member.

4. A starter motor, for an internal combustion engine, comprising an electric motor, a shaft rotated by said motor, a pinion gear wheel carried by said shaft, the pinion gear wheel being rotated with the shaft, and being axially movable relative thereto between an operative position and a rest position, and an electromagnet comprising an armature coupled to the pinion gear wheel and guided for movement parallel to the shaft, first and second electromagnet poles spaced apart around said shaft, the first and second poles being spaced from the armature in the rest position thereof in the direction of movement of the armature, a member magnetically interconnecting the first and second poles, and an electromagnet winding which when energized induces a flow of magnetic flux in the flux path of the eleectromagnet, the flux path of the electromagnet being from the first pole to the armature, within the armature laterally relative to said shaft, from the armature to the second pole, and from the second pole within said member back to the first pole, wherein said first and second poles lie in a common plane transverse to the axis of said shaft, wherein the member magnetically interconnecting the poles is arcuate and coaxial with the shaft, and wherein said member is a complete cylinder, those portions of the poles presented to the armature being stepped, and the periphery of the armature being shaped to mate with the stepped form of the poles.

5. A starter motor, for an internal combustion engine, comprising an electric motor, a shaft rotated by said motor, a pinion gear wheel carried by said shaft, the pinion gear wheel being rotated with the shaft, and being axially movable relative thereto between an operative position and a rest position, and a electromagnet comprising an armature coupled to the pinion gear wheel and guided for movement parallel to the shaft, first and second electromagnet poles spaced apart around said shaft, the first and second poles being spaced from the armature in the rest position thereof in the direction of movement of the armature, a member magnetically interconnecting the first and second poles, and an electromagnet winding which when energized induces a flow of magnetic flux in the flux path of the electromagnet, the flux path of the electromagnet being from the first pole to the armature, within the armature laterally relative to said shaft, from the armature to the second pole, and from the second pole within said member back to the first pole, wherein said first and second poles lie in a common plane transverse to the axis of said shaft, and wherein the armature and the poles have associated therewith a non-magnetic spacer which prevents physical contact between the armature and poles and so facilitates movement of the armature away from the poles when the electromagnet is de-energized, those portions of the poles presented to the armature being stepped, and the periphery of the armature being shaped to mate with the stepped form of the poles.

6. A starter motor, for an internal combustion engine, comprising an electric motor, a shaft rotated by said motor, a pinion gear wheel carried by said shaft, the pinion gear wheel being rotated with the shaft, and being axially movable relative thereto between an operative position and a rest position, and an electromagnet comprising an armature coupled to the pinion gear wheel and guided for movement parallel to the shaft, first and second electromagnet poles spaced apart around said shaft, the first and second poles being spaced from the armature in the rest position thereof in the direction of movement of the armature, a member magnetically interconnecting the first and second poles, and en electromagnet winding which when energized induces a flow of magnetic flux in the flux path of the electromagnet, the flux path of the electromagnet being from the first pole to the armature, within the armature laterally relative to said shaft, from the armature to the second pole, and from the second pole within said member back to the first pole, wherein said first and second poles lie in a common plane transverse to the axis of said shaft, and wherein the armature is guided for movement parallel to said shaft by said poles through the intermediary of a non-magnetic spacer, those portions of the poles presented to the armature being stepped, and the periphery of the armature being shaped to mate with the stepped form of the poles.

7. A starter motor as claimed in claim 6, wherein the non-magnetic member is a sleeve carried by the armature and engaging the poles.

8. A starter motor for an internal combustion engine, comprising an electric motor, a shaft rotated by said motor, a pinion gear wheel carried by said shaft, the pinion gear wheel being rotated with the shaft, and being axially movable relative thereto between an operative position and a rest position, and an electromagnet comprising an armature coupled to the pinion gear wheel and guided for movement parallel to the shaft, first and second electromagnet poles spaced apart around said shaft, the first and second poles being spaced from the armature in the rest position thereof in the direction of movement of the armature, a member magnetically interconnecting the first and second poles, and an electromagnet winding which when energized induces a flow of magnetic flux in the flux path of the electromagnet, the flux path of the electromagnet being from the first pole to the armature, within the armature laterally relative to said shaft, from the armature to the second pole, and from the second pole within said member back to the first pole, wherein said first and second poles lie in a common plane transverse to the axis of said shaft, and wherein said shaft is a secondary shaft driven by the rotor shaft of the starter motor, and wherein the secondary shaft is driven by the rotor shaft through an epicyclic gear train, those portions of the poles presented to the armature being stepped, and the periphery of the armature being shaped to mate with the stepped form of the poles.

9. A starter motor, for an internal combustion, engine, comprising an electric motor, a shaft rotated by said motor, a pinion gear wheel carried by said shaft, the pinion gear wheel being rotated with the shaft, and being axially movable relative thereto between an operative position and a rest position, and an electromagnet comprising an armature coupled to the pinion gear wheel and guided for movement parallel to the shaft, first and second electromagnet poles spaced apart around said shaft, the first and second poles being spaced from the armature in the rest position thereof in the direction of movement of the armature, a member magnetically interconnecting the first and second poles, and an electromagnet winding which when energized induces a flow of magnetic flux in the flux path of the electromagnet, the flux path of the electromagnet being from the first pole to the armature, within the armature laterally relative to said shaft, from the armature to the second pole, and from the second pole within said member back to the first pole, wherein said first and second poles lie in a common plane transverse to the axis of said shaft, wherein said shaft is a secondary shaft driven by the rotor shaft of the starter motor, and wherein the field arrangement of the starter motor is a permanent magnet arrangement those portions of the poles presented to the armature being stepped, and the periphery of the armature being shaped to mate with the stepped form of the poles.

10. A starter motor, for an internal combustion engine, comprising an electric motor, a shaft rotated by said motor, a pinion gear wheel carried by said shaft, the pinion gear wheel being rotated with the shaft, and being axially movable relative thereto between an operative position and a rest position, and an electromagnet comprising an armature coupled to the pinion gear wheel and guided for movement parallel to the shaft, first and second electromagnet poles spaced apart around said shaft, the first and second poles being spaced from the armature in the rest position thereof in the direction of movement of the armature, a member magnetically interconnecting the first and second poles, and an electromagnet winding which when energized induces a flow of magnetic flux in the flux path of the electromagnet, the flux path of the electromagnet being from the first pole to the armature, within the armature laterally relative to said shaft, from the armature to the second pole, and from the second pole within said member back to the first pole, wherein said first and second poles lie in a common plane transverse to the axis of said shaft and wherein there is provided a set of electrical contacts controlling energization of the starter motor, the contacts being operated when the armature moves to a predetermined position relative to the remainder of the starter motor, those portions of the poles presented to the armature being stepped, and the periphery of the armature being shaped to mate with the stepped form of the poles.

11. A starter motor as claimed in claim 10, wherein said set of electrical contacts includes a fixed contact carried by the casing and a movable contact carried by the armature and engageable with the fixed contact.

12. A starter motor of an internal combustion engine comprising in combination a casing including a cylindrical main portion housing the motor field assembly, a yoke coaxial with the main portion, and an end bracket, the yoke being positioned between the end bracket and the casing main portion, a rotor shaft journalled for rotation in the casing main portion and the end bracket and extending through the yoke, a pair of electromagnet poles carried by the yoke and extending generally diametrically opposite one another towards the rotor shaft, an electromagnet winding encircling each of the poles, a pinion gear wheel carried by the rotor shaft and rotatable therewith, the pinion gear wheel being movable axially relative to the rotor shaft and having an electromagnet armature coupled thereto, a non-magnetic sleeve carried by the armature and slidably engaging said poles so as to guide the armature for movement relative to the poles in a direction parallel to the shaft and resilient means urging the armature and the pinion to a rest position wherein the armature is spaced from the poles, said windings when energized inducing a flow of magnetic flux from one of the poles to the armature across the air gap, through the armature in a direction transverse to the shaft, from the armature back to the other pole, and from the other pole circumferentially within the yoke back to said one pole, those portions of the poles presented to the armature being stepped, and the periphery of the armature being shaped to mate with the stepped form of the poles.

13. A starter motor for an internal combustion engine, comprising in combination: a casing including a cylindrical main portion, a yoke portion, and an end portion, the yoke portion being positioned between the end portion and the casing main portion, an electric motor having an armature and a field assembly with poles disposed in said casing main portion, a shaft journalled for rotation by said electric motor in the end portion and extending through the yoke portion, a separate pair of electromagnet poles carried by the yoke portion and extending generally diametrically opposite one another towards the shaft, a separate electromagnet winding encircling at least one of the separate poles, a pinion gear wheel carried by the shaft and rotatable therewith, the pinion gear wheel being movable axially relative to the shaft and having a separate electromagnet armature coupled thereto, means for guiding the separate armature for movement relative to the separate poles in a direction parallel to the shaft, said separate armature entering an area between said separate poles as said separate armature moves the pinion towards an operative position, resilient means urging the separate armature and the pinion to a rest position wherein the separate armature is spaced from the separate poles, said separate electromagnet winding when energized inducing a flow of magnetic flux from one of the separate poles to the separate armature across an air gap, through the separate armature in a direction transverse to the shaft, from the separate armature back to the other separate pole, and from the other separate pole circumferentially within the yoke portion back to said one separate pole so as to attract said separate armature and effect a controlled movement of said separate armature in said direction parallel to said shaft, those portions of the separate poles presented to the separate armature being stepped, and the periphery of the separate armature being shaped to mate with the stepped form of the separate poles.

14. A starter motor as claimed in claim 13, wherein said separate pair of poles lie in a common plane transverse to the axis of said shaft.

15. A starter motor as claimed in claim 13, wherein said separate poles extend radially towards said shaft.

16. A starter motor as claimed in claim 15, wherein the separate poles present part cylindrical surfaces to the shaft and the separate armature includes a part cylindrical portion which can be received between the poles.

17. A starter motor as claimed in claim 13, wherein there is provided an electromagnet winding for each electromagnet pole.

18. A starter motor as claimed in claim 13, wherein there are provided third and fourth electromagnetic windings and two pair of separate poles, where all four windings encircle respective poles.

19. A starter motor as claimed in claim 13, further including a member magnetically interconnecting the separate poles the member being arcuate and coaxial with the shaft.

20. A starter motor as claimed in claim 19, wherein said member is a part of a cylinder.

21. A starter motor as claimed in claim 13, wherein the separate armature is carried by a part moving with the pinion gear wheel so that the separate armature is guided for movement parallel with the shaft, by the pinion and said part.

22. A starter motor as claimed in claim 13, wherein a part is provided for magnetically interconnecting the separate poles, the part being a portion of the casing of the starter motor.

23. A starter motor as claimed in claim 22, wherein the member is an integral portion of the casing.

24. A starter motor as claimed in claim 22, wherein said member is a part constituting a portion of the starter motor casing when secured to the remainder of the casing.

25. A starter motor as claimed in claim 13, wherein a member is provided for magnetically interconnecting the separate poles and includes a separate component secured to the casing of the starter motor.

26. A starter motor as claimed in claim 25, wherein the component is secured to the casting by the fastening device which secure the poles to the member.

27. A starter motor as claimed in claim 13, wherein that region of the casing of the starter motor adjacent the separate poles is non-magnetic material and includes a member magnetically interconnecting the separate poles, the member being a separate component secured to the casing.

28. A starter motor as claimed in claim 27, wherein at least one of the poles is integral with said member which magnetically interconnects the poles.

29. A starter motor as claimed in claim 13, wherein said shaft is the rotor shaft of the electric motor.

30. A starter motor as claimed in claim 13, wherein said shaft is a secondary shaft driven by the rotor shaft of the electric motor.

31. A starter motor as claimed in claim 30, wherein the secondary shaft is driven by said rotor shaft through gear wheels.

32. A starter motor as claimed in claim 13, wherein said yoke is trapped in position by the end portion and the casing main portion.

33. A starter motor, for an internal combustion engine, comprising an electric motor, a shaft rotated by said motor, a pinion gear wheel carried by said shaft, the pinion gear wheel being rotated with the shaft, and being axially movable relative thereto between an operative position and a rest position, and an electromagnet comprising an armature coupled to the pinion gear wheel and guided for movement parallel to the shaft, first and second electromagnet poles spaced apart around said shaft, the first and second poles being spaced from the armature in the rest position thereof in the direction of movement of the armature, a member magnetically interconnecting the first and second poles, and an electromagnet winding which when energized induces a flow of magnetic flux in the flux path of the electromagnetic, the flux path of the electromagnet being from the first pole to the armature, within the armature laterally relative to said shaft, from the armature to the second pole, and from the second pole within said member back to the first pole, wherein said first and second poles lie in a common plane transverse to the axis of said shaft, and those portions of the poles presented to the armature are stepped, the periphery of the armature being shaped to mate with the stepped form of the poles.

34. A starter motor, for an internal combustion engine, comprising an electric motor, a shaft rotated by said motor, a pinion gear wheel carried by said shaft, the pinion gear wheel being rotated with the shaft, and being axially movable relative thereto between an operative position and a rest position, and an electromagnet comprising an armature coupled to the pinion gear wheel and guided for movement parallel to the shaft, first and second electromagnet poles spaced apart around said shaft, the first and second poles being spaced from the armature in the rest position thereof in the direction of movement of the armature, a member magnetically interconnecting the first and second poles, and an electromagnet winding which when energized induces a flow of magnetic flux in the flux path of the electromagnet, the flux path of the electromagnet being from the first pole to the armature, within the armature laterally relative to said shaft, from the armature to the second pole, and from the second pole within said member back to the first pole, wherein said first and second poles lie in a common plane transverse to the axis of said shaft, and said armature is of frusto-conical form, said poles being of mating frusto-conical form.

35. A starter motor, for an internal combustion engine, comprising an electric motor, a shaft rotated by said motor, a pinion gear wheel carried by said shaft, the pinion gear wheel being rotated with the shaft, and being axially movable relative thereto between an operative position and a rest position, and an electromagnet comprising an armature coupled to the pinion gear wheel and guided for movement parallel to the shaft, first and second electromagnet poles spaced apart around said shaft, the first and second poles being spaced from the armature in the rest position thereof in the direction of movement of the armature, a member magnetically interconnecting the first and second poles, and an electromagnet winding which when energized induces a flow of magnetic flux in the flux path of the electromagnet, the flux path of the electromagnet being from the first pole to the armature, with the armature laterally relative to said shaft, from the armature to the second pole, and from the second pole within said member back to the first pole, wherein said first and second poles lie in a common plane transverse to the axis of said shaft, third and fourth electromagnet poles, the third and fourth poles being spaced from the first and second poles in said plane, and being magnetically connected to the first and second poles by said member, said armature being of frusto-conical form, and said poles being of mating frusto-conical form.

36. A starter motor, for an internal combustion engine, comprising an electric motor, a shaft rotated by said motor, a pinion gear wheel carried by said shaft, the pinion gear wheel being rotated with the shaft, and being axially movable relative thereto between an operative position and a rest position, and an electromagnet comprising an armature coupled to the pinion gear wheel and guided for movement parallel to the shaft, first and second electromagnet poles spaced apart around said shaft, the first and second poles being spaced from the armature in the rest position thereof in the direction of movement of the armature, a member magnetically interconnecting the first and second poles, and an electromagnet winding which when energized induces a flow magnetic flux in the flux path of the electromagnet, the flux path of the electromagnet being from the first pole to the armature, within the armature laterally relative to said shaft, from the armature to the second pole, and from the second pole within said member back to the first pole, wherein said first and second poles lie in a common plane transverse to the axis of said shaft, a second electromagnet winding, both windings encircling respective poles, and, a third electromagnet winding, said armature being of frusto-conical form, and said poles being of mating frusto-conical form.

37. A starter motor as claimed in claim 36 in which the third electromagnet winding encircles said member.

38. A starter motor, for an internal combustion engine, comprising an electric motor, a shaft rotated by said motor, a pinion gear wheel carried by said shaft, the pinion gear wheel being rotated with the shaft, and being axially movable relative thereto between an operative position and a rest position, and an electromagnet comprising an armature coupled to the pinion gear wheel and guided for movement parallel to the shaft, first and second electromagnet poles spaced apart around said shaft, the first and second poles being spaced from the armature in the rest position thereof in the direction of movement of the armature, a member magnetically intercommenting the first and second poles, and an electromagnet winding which when energized induces a flow of magnetic flux in the flux path of the electromagnet, the flux path of the electromagnet being from the first pole to the armature, within the armature laterally relative to said shaft, from the armature to the second pole, and from the second pole within said member back to the first pole, wherein said first and second poles lie in a common plane transverse to the axis of said shaft, the member magnetically interconnecting the poles being arcuate and coaxial with the shaft, and said member being a complete cylinder, said armature being of frusto-conical form, and said poles being of mating frusto-conical form.

39. A starter motor, for an internal combustion engine, comprising an electric motor, a shaft rotated by said motor, a pinion gear wheel carried by said shaft, the pinion gear wheel being rotated with the shaft, and being axially movable relative thereto between an operative position and a rest position, and an electromagnet comprising an armature coupled to the pinion gear wheel and guided for movement parallel to the shaft, first and second electromagnet poles spaced apart around said shaft, the first and second poles being spaced from the armature in the rest position thereof in the direction of movement of the armature, a member magnetically interconnecting the first and second poles, and an electromagnet winding which when energized induces a flow of magnetic flux in the flux path of the electromagnet, the flux path of the electromagnet being from the first pole to the armature, within the armature laterally relative to said shaft, from the armature to the second pole, and from the second pole within said member back to the first pole, wherein said first and second poles lie in a common plane transverse to the axis of said shaft, and wherein the armature and the poles have associated therewith a nonmagnetic spacer which prevents physical contact between the armature and the poles and so facilitates movement of the armature away from the poles when the electromagnet is de-energized, the armature being of frusto-conical form, and said poles being of mating frusto-conical form.

40. A starter motor, for an internal combustion engine, comprising an electric motor, a shaft rotated by said motor, a pinion gear wheel carried by said shaft, the pinion gear wheel being rotated with the shaft, and being axially movable relative thereto between an operative position and a rest position, and an electromagnet comprising an armature coupled to the pinion gear wheel and guided for movement parallel to the shaft, first and second electromagnet poles spaced apart around said shaft, the first and second poles being spaced from the armature in the rest position thereof in the direction of movement of the armature, a member magnetically interconnecting the first and second poles, and an electromagnet winding which when energized induces a flow of magnetic flux in the flux path of the electromagnet, the flux path of the electromagnet being from the first pole to the armature, within the armature laterally relative to said shaft, from the armature to the second pole, and from the second pole within said member back to the first and second poles lie in a common plane transverse to the axis of said shaft, and wherein the armature is guided for movement parallel to said shaft by said poles through the intermediary of a non-magnetic member, said armature being of frusto-conical form, and said poles being of mating frusto-conical form.

41. A starter motor as claimed in claim 40 wherein the non-magnetic member is a sleeve carried by the armature and engaging the poles.

42. A starter motor, for an internal combustion engine, comprising an electric motor, a shaft rotated by said motor, a pinion gear wheel carried by said shaft, the pinion gear wheel being rotated with the shaft, and being axially movable relative thereto between an operative position and a rest position, and an electromagnet comprising an armature coupled to the pinion gear wheel and guided for movement parallel to the shaft, first and second electromagnet poles spaced apart around said shaft, the first and second poles being spaced from the armature in the rest position thereof in the direction of movement of the armature, a member magnetically interconnecting the first and second poles, and an electromagnet winding which when energized induces a flow of magnetic flux in the flux path of the electromagnet, the flux path of the electromagnet being from the first pole to the armature, within the armature laterally relative to said shaft, from the armature to the second pole, and from the second pole within said member back to the first pole, wherein said first and second poles lie in a common plane transverse to the axis of said shaft, and wherein said shaft is a secondary shaft driven by the rotor shaft of the starter motor, the secondary shaft being driven by the rotor shaft through an epicyclic gear train, and said armature being of frusto-conical form, said poles being of mating frusto-conical form.

43. A starter motor, for an internal combustion engine, comprising an electric motor, a shaft rotated by said motor, a pinion gear wheel carried by said shaft, the pinion gear wheel being rotated with the shaft, and being axially movable relative thereto between an operative position and a rest position, and an electromagnet comprising an armature coupled to the pinion gear wheel and guided for movement parallel to the shaft, first and second electromagnet poles spaced apart around said shaft, the first and second poles being spaced from the armature in the rest position thereof in the direction of movement the armature, a member magnetically interconnecting the first and second poles, and an electromagnet winding which when energized induces a flow of magnetic flux in the flux path of the electromagnet, the flux path of the electromagnet being from the first pole to the armature, within the armature laterally relative to said shaft, from the armature to the second pole, and from the second pole within said member back to the first pole, wherein said first and second poles lie in a common plane transverse to the axis of said shaft, wherein said shaft is a secondary shaft driven by the rotor shaft of the starter motor, the field arrangement of the starter motor being a permanent magnet arrangement, said armature being of frusto-conical form, and said poles being of mating frusto-conical form.

44. A starter motor, for an internal combustion engine, comprising an electric motor, a shaft rotated by said motor, a pinion gear wheel carried by said shaft, the pinion gear wheel being rotated with the shaft, and being axially movable relative thereto between an operative position and a rest position, and an electromagnet comprising an armature coupled to the pinion gear wheel and guided for movement parallel to the shaft, first and second electromagnet poles spaced apart around said shaft, the first and second poles being spaced from the armature in the rest position thereof in the direction of movement of the armature, a member magnetically interconnecting the first and second poles, and an electromagnet winding which when energized induces a flow of magnetic flux in the flux path of the electromagnet, the flux path of the electromagnet being from the first pole to the armature, within the armature laterally relative to said shaft, from the armature to the second pole, and from the second pole within said member back to the first pole, wherein said first and second poles lie in a common plane transverse to the axis of said shaft, and wherein there is provided a set of electrical contacts controlling energization of the starter motor, the contacts being operated when the armature moves to a predetermined position relative to the remainder of the starter motor, the armature being of frusto-conical form, and said poles being of mating frusto-conical form.

45. A starter motor as claimed in claim 44, wherein said set of electrical contacts includes a fixed contact carried by the casing and a movable contact carried by the armature and engageable with the fixed contact.

46. A starter motor for an internal combustion engine comprising in combination a casing including a cylindrical main portion housing the motor field assembly, a yoke co-axial with the main portion, and an end bracket, the yoke being positioned between the end bracket and the casing main portion, a rotor shaft journalled for rotation in the casing main portion and the end bracket and extending through the yoke, a pair of electromagnet poles carried by the yoke and extending generally diametrically opposite one another towards the rotor shaft, an electromagnet winding encircling each of the poles, a pinion gear wheel carried by the rotor shaft and rotatable therewith, the pinion gear wheel being movable axially relative to the rotor shaft and having an electromagnet armature coupled thereto, a non-magnetic sheelve carried by the armature and slidably engaging said pole so as to guide the armature for movement relative to the poles in a direction parallel to the shaft and resilient means urging the armature and the pinion to a rest position wherein the armature is spaced from the poles, said windings when energized inducing a flow of magnetic flux from one of the poles to the armature across the air gap, through the armature in a direction transverse to the shaft, from the armature back to the other pole, and from the other pole circumferentially within the yoke back to said one pole, said armature being of frusto-conical form, and said poles being of mating frusto-conical form.

47. A starter motor for an internal combustion engine, comprising in combination: a casing including a cylindrical main portion, a yoke portion, and an end portion, the yoke portion being positioned between the end portion and the casing main portion, an electric motor having an armature and a field assembly with poles disposed in said casing main portion, a shaft journalled for rotation by said electric motor in the end portion and extending through the yoke portion, a separate pair of electromagnet poles carried by the yoke portion and extending generally diametrically opposite one another towards the shaft, a separate electromagnet winding encircling at least one of the separate poles, a pinion gear wheel carried by the shaft and rotatable therewith, the pinion gear wheel being movable axially relative to the shaft and having a separate electromagnet armature coupled thereto, means for guiding the separate armature for movement relative to the separate poles in a direction parallel to the shaft, said separate armature entering an area between said separate poles as said separate poles as said separate armature moves the pinion towards an operative position, resilient means urging the separate armature and the pinion to a rest position wherein the separate armature is spaced from the separate poles, said separate electromagnet winding when energized inducing a flow of magnetic flux from one of the separate poles to the separate armature across an air gap, through the separate armature in a direction transverse to the shaft, from the separate armature back to the other separate pole, and from the other separate pole circumferentially within the yoke portion back to said one separate pole so as to attract said separate armature and effect a controlled movement of said separate armature in said direction parallel to said shaft, said separate armature being of frusto-conical form, and those portions of said separate poles presented to said separate armature being of mating frusto-conical form.

48. A starter motor as claimed in claim 47 wherein said separate pair of poles lie in a common plane transverse to the axis of the shaft.

49. A starter motor as claimed in claim 47 wherein said separate poles extend radially towards said shaft.

50. A starter motor as claimed in claim 47 wherein there is provided an electromagnet winding for each electromagnet pole.

51. A starter motor as claimed in claim 47 wherein there are provided third and fourth electromagnet windings and two pairs of separate poles, where all four windings encircle respective poles.

52. A starter motor as claimed in claim 47, further including a member magnetically interconnecting the separate poles the member being arcuate and coaxial with the shaft.

53. A starter motor as claimed in claim 52 wherein said member is a part of a cylinder.

54. A starter motor as claimed in claim 47 wherein the separate armature is carried by a part moving with the pinion gear wheel so that the separate armature is guided for movement parallel to the shaft by the pinion and said part.

55. A starter motor as claimed in claim 47 wherein a part is provided magnetically interconnecting the separate poles, the part being a portion of the casing of the starter motor.

56. A starter motor as claimed in claim 55, wherein the member is an integral portion of the casing.

57. A starter motor as claimed in claim 55 wherein said member is a part constituting a portion of the starter motor casing when secured to the remainder of the casing.

58. A starter motor as claimed in claim 47 wherein a member is provided for magnetically interconnecting the separate poles and includes a separate component secured to the casing of the starter motor.

59. A starter motor as claimed in claim 58 wherein the component is secured to the casing by the fastening devices which secure the poles to the member.

60. A starter motor as claimed in claim 47 wherein that region of the casing of the starter motor adjacent the separate poles is non-magnetic material and includes a member magnetically interconnecting the separate poles, the member being a separate component secured to the casing.

* * * * *